(12) United States Patent
Fischer et al.

(10) Patent No.: US 7,313,121 B2
(45) Date of Patent: Dec. 25, 2007

(54) ACKNOWLEDGING DATA TRANSMISSIONS IN THE PRESENCE OF MULTIPLE SHARED-COMMUNICATIONS CHANNELS

(75) Inventors: Michael Andrew Fischer, San Antonio, TX (US); Maarten Menzo Wentink, Utrecht (NL)

(73) Assignee: Conexant, Inc., Red Bank, NJ (US)

( * ) Notice: Subject to any disclaimer, the term of this patent is extended or adjusted under 35 U.S.C. 154(b) by 629 days.

(21) Appl. No.: 10/801,042

(22) Filed: Mar. 15, 2004

(65) Prior Publication Data

US 2004/0223478 A1 Nov. 11, 2004

Related U.S. Application Data

(60) Provisional application No. 60/469,263, filed on May 9, 2003.

(51) Int. Cl.
 *H04Q 7/24* (2006.01)
(52) U.S. Cl. ............... 370/338; 370/349; 370/329; 370/341; 370/328; 455/450; 455/509
(58) Field of Classification Search ............ 370/445, 370/449, 322, 470–471, 346–349, 326, 328–329, 370/335, 341, 431–432, 338; 455/434, 450–453, 455/509, 511–517, 524–525, 458, 102–103, 455/179.1, 180
See application file for complete search history.

(56) References Cited

U.S. PATENT DOCUMENTS

| | | | |
|---|---|---|---|
| 4,809,268 A * | 2/1989 | Tejima et al. ............ | 370/346 |
| 6,198,735 B1 * | 3/2001 | Pazhyannur et al. ...... | 370/349 |
| 6,393,032 B1 * | 5/2002 | Ikegami .................. | 370/447 |
| 6,757,248 B1 * | 6/2004 | Li et al. .................. | 370/235 |
| 6,834,039 B1 * | 12/2004 | Kelly et al. .............. | 455/453 |
| 6,977,944 B2 * | 12/2005 | Brockmann et al. ...... | 370/461 |
| 7,061,856 B2 * | 6/2006 | Banerjee ................ | 370/349 |
| 7,069,038 B2 * | 6/2006 | Hakkinen et al. ........ | 370/337 |
| 7,072,309 B2 * | 7/2006 | Xie et al. ................ | 370/278 |
| 7,177,300 B2 * | 2/2007 | Murakami et al. ........ | 370/349 |
| 2003/0031161 A1 * | 2/2003 | Froehlich et al. ........ | 370/338 |
| 2003/0152058 A1 * | 8/2003 | Cimini et al. ............ | 370/349 |
| 2003/0181212 A1 * | 9/2003 | Wentink et al. .......... | 455/450 |
| 2004/0029590 A1 * | 2/2004 | Wentink ................ | 455/450 |
| 2004/0071154 A1 * | 4/2004 | Wentink ................ | 370/448 |
| 2004/0085992 A1 * | 5/2004 | Wentink ................ | 370/445 |
| 2005/0002412 A1 * | 1/2005 | Sagfors' et al. .......... | 370/437 |
| 2005/0141419 A1 * | 6/2005 | Bergamasco et al. ..... | 370/401 |

* cited by examiner

*Primary Examiner*—George Eng
*Assistant Examiner*—Kamran Afshar
(74) *Attorney, Agent, or Firm*—Thomas, Kayden, Horstemeyer & Risley (57) ABSTRACT

A technique is disclosed that improves the efficiency of transmitting data over multiple shared-communications channels without some of the costs and disadvantages associated with techniques in the prior art. In particular, and in accordance with the illustrative embodiment of the present invention, a data frame is simultaneously transmitted across a plurality of channels, but the acknowledgment frame to the data frame is not. Instead, a plurality of redundant acknowledgment frames are generated and each one is transmitted independently and within each of the channels used to transmit the data frame.

17 Claims, 7 Drawing Sheets

ACKNOWLEDGING DATA TRANSMISSIONS IN THE PRESENCE OF MULTIPLE SHARED-COMMUNICATIONS CHANNELS

CROSS-REFERENCE TO RELATED APPLICATIONS

This application claims the benefit of U.S. Provisional Patent Application Ser. No. 60/469,263, entitled "Variable-Width Modulation Schemes Featuring Backward-Compatible Local Area Network Operation," filed on May 9, 2003, which is incorporated by reference.

FIELD OF THE INVENTION

The present invention relates to telecommunications in general, and, more particularly, to local area networks.

BACKGROUND OF THE INVENTION

Figure 1:
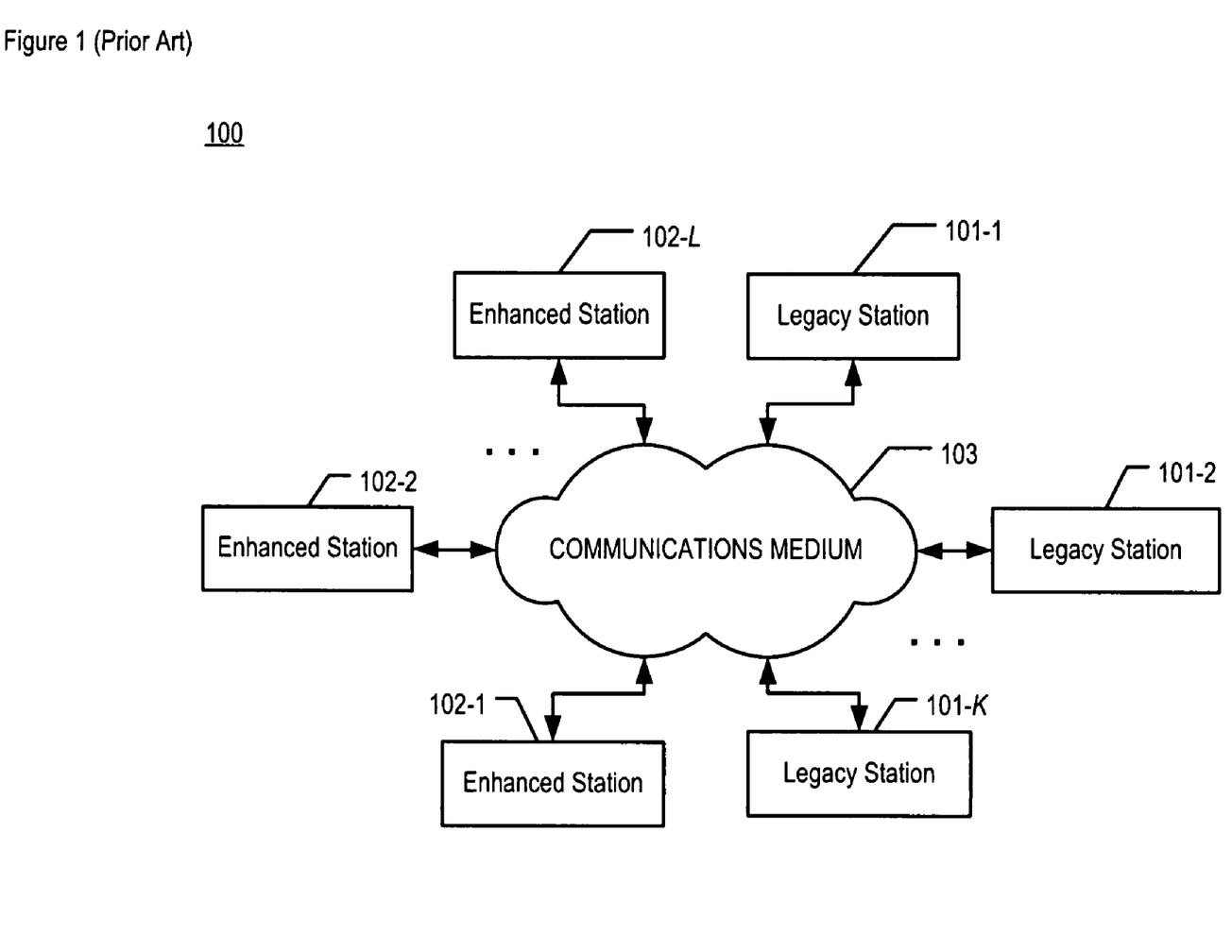
FIG. 1 depicts a schematic diagram of wireless local area network 100 in the prior art.

FIG. 1 depicts a schematic diagram of a portion of wireless local area network 100 in the prior art. Local area network 100 comprises legacy stations 101-1 through 101-K, wherein K is a positive integer, and enhanced stations 102-1 through 102-L, wherein L is a positive integer. Legacy stations 101-1 through 101-K and enhanced stations 102-1 through 102-L use shared-communications medium 103 to communicate among themselves. Shared-communications medium 103 comprises multiple shared-communications channels. Only one of the stations can transmit into a given channel at a time, although one of the stations can transmit into a first channel while another station transmits into a second channel.

When two stations transmit into a given channel at the same time, the result is a cacophony and both transmissions are garbled. Prior art techniques, such as Carrier Sense Multiple Access, are used by the stations to coordinate when each of them transmits over a single shared-communications channel.

Legacy stations 101-1 through 101-K can transmit and receive using:
i. a modulation scheme that uses one shared-communications channel at a time (i.e., a single-channel modulation scheme).

In contrast, enhanced stations 102-1 through 102-L can transmit and receive using:
i. a modulation scheme that uses one shared-communications channel at a time (i.e., a single-channel modulation scheme), and
ii. a modulation scheme that uses multiple shared-communications channels simultaneously (i.e., a multi-channel modulation scheme).

Any two stations that need to communicate must do so in accordance with a modulation scheme that is available to both of them. Therefore, two enhanced stations can communicate with each other by using a multi-channel modulation scheme, but any communication involving a legacy station must use a single-channel modulation scheme.

Enhanced stations 102-1 and 102-2, for example, communicate with each other by using the multi-channel modulation scheme when possible because it enhances communication throughput in comparison to the single-channel modulation scheme. One effect of using the multi-channel modulation scheme, however, is that legacy station 101-1, for example, cannot detect when enhanced stations 102-1 and 102-2 are communicating (i.e., enhanced stations 102-1 and 102-2 are essentially undetectable by legacy station 101-1 when enhanced stations 102-1 and 102-2 are communicating by using the multi-channel modulation scheme). This can cause legacy station 101-1 to transmit when enhanced stations 102-1 and 102-2 are communicating, which causes all of the transmissions to be garbled.

Even if enhanced station 102-1 successfully transmits the data block to enhanced station 102-2, enhanced station 102-2 might subsequently have difficulty transmitting an acknowledgment of the data block back to enhanced station 102-1. The difficulty in transmitting the acknowledgment is attributed to the same reason of enhanced nodes being undetectable that was described earlier. In the event of an unsuccessful acknowledgment transmission, enhanced station 102-1 has to re-transmit the data block in its entirety.

What is needed is a way to improve data transmission over multiple shared-communications channels without some of the performance disadvantages in the prior art.

SUMMARY OF THE INVENTION

The present invention provides a technique that improves the efficiency of transmitting data over multiple shared-communications channels without some of the costs and disadvantages associated with techniques in the prior art. In particular, and in accordance with the illustrative embodiment of the present invention, a data frame is simultaneously transmitted across a plurality of channels, but the acknowledgment frame to the data frame is not. Instead, a plurality of redundant acknowledgment frames are generated and each one is transmitted independently and within each of the channels used to transmit the data frame.

For example, a single data frame is transmitted across two channels, and a redundant acknowledgment frame is transmitted in each of the two channels in legacy mode. Although a single acknowledgment frame could be transmitted across the two channels, the transmission of redundant acknowledgment frames in each channel is advantageous because it increases the likelihood that the acknowledgment will be received. The likelihood that the acknowledgment will be received is increased in accordance with the present invention because the acknowledgment will be received even when one of the channels is unusable, whereas the disruption of either channel would prevent the reception of an acknowledgment frame that spans two channels.

When the likelihood that the acknowledgment will be received is increased, the number of unnecessary data retransmissions is reduced, which saves channel bandwidth.

The station receiving the acknowledgment, in some embodiments, can take action based on (i) the contents of the received acknowledgment frame or frames and (ii) the channel or channels over which the acknowledgment was received. For example, depending on the indications provided in a received acknowledgment and the channel over which the acknowledgment was received, the station might decide to re-transmit some of the data block or the entire data block over one or more shared-communications channels, or the station might decide that a re-transmission is unnecessary.

In some embodiments of the present invention, before transmitting the data frame, a station transmits a control frame (e.g., a clear_to_send frame, etc.) into each communications channel to ensure that the communications channel is available. The multiple control frames specify a duration value that protects the subsequent transmission over multiple channels.

An illustrative embodiment of the present invention comprises: receiving a first portion of a data block on a first shared-communications channel; receiving a second portion of the data block on a second shared-communications channel; transmitting a first acknowledgment frame into the second shared-communications channel only, wherein the first acknowledgment frame indicates receipt of the first portion of the data block; and transmitting a second acknowledgment frame into the first shared-communications channel only, wherein the second acknowledgment frame indicates receipt of the second portion of the data block.

DETAILED DESCRIPTION

Figure 2:
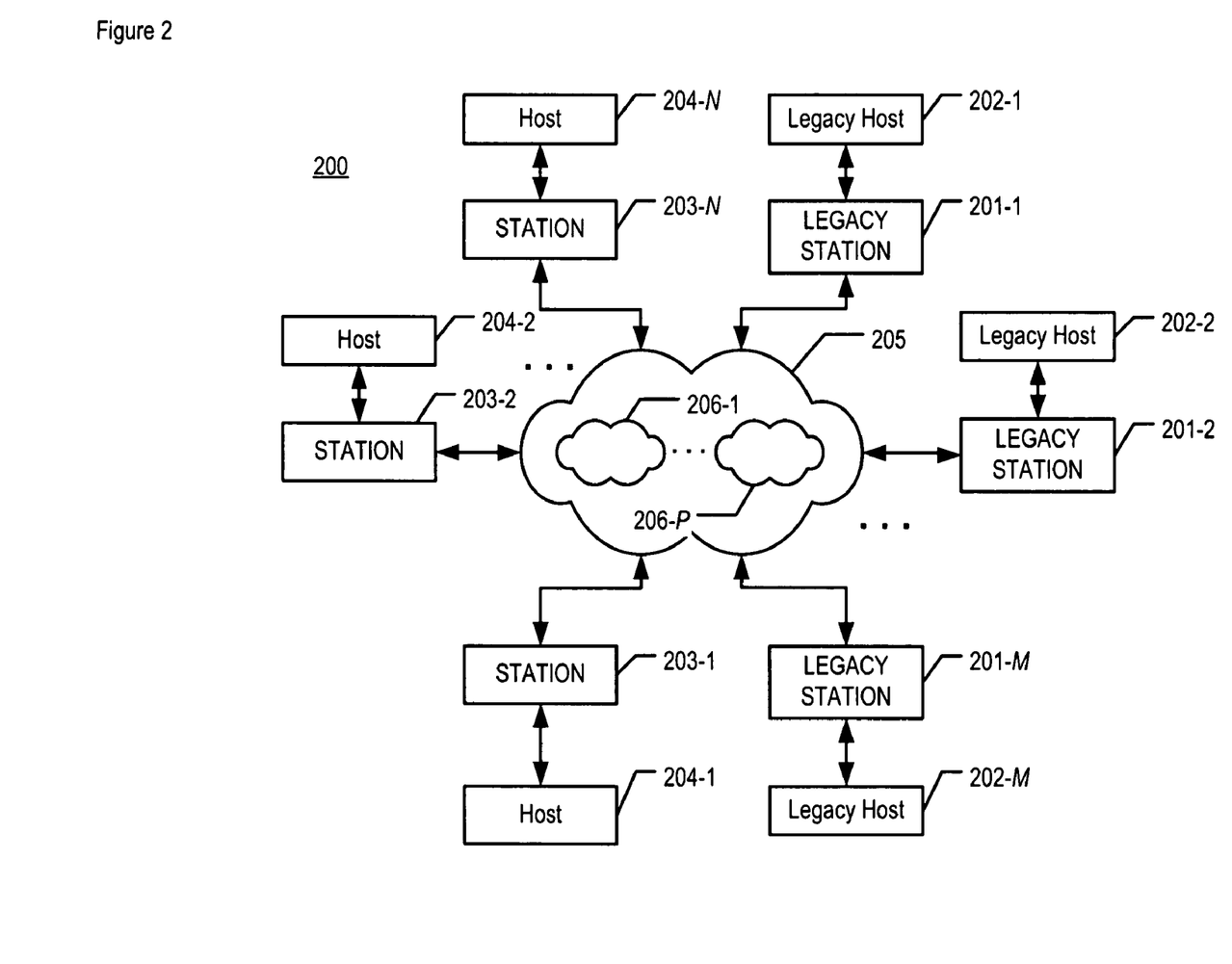
FIG. 2 depicts a schematic diagram of a portion of network 200 in accordance with the illustrative embodiment of the present invention.

FIG. 2 depicts a schematic diagram of network 200 in accordance with the illustrative embodiment of the present invention. Network 200 operates in accordance with the IEEE 802.11 set of protocols and comprises legacy stations 201-1 through 201-M, wherein M is a positive integer; legacy host computers 202-1 through 202-M; enhanced stations 203-1 through 203-N, wherein N is a positive integer; host computers 204-1 through 204-N; and wireless communications medium 205, interconnected as shown. Wireless communications medium 205 comprises shared-communications channels 206-1 through 206-P.

It will be clear to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible communications medium.

Legacy station 201-i, for i=1 through M, comprises the radios that enable legacy host computer 202-i to communicate via communications medium 205 by using a single shared-communications channel 206-k at a time, wherein k is a value between 1 and P, inclusive. Legacy station 201-i is capable of receiving data blocks from legacy host computer 202-i and transmitting over communications medium 205 data frames comprising the data received from legacy host computer 202-i. Legacy station 201-i is also capable of receiving data frames from shared communications channel 205 and sending to legacy host computer 202-i data blocks comprising data from the data frames. It will be clear to those skilled in the art how to make and use legacy station 201-i.

Legacy host computer 202-i is capable of generating data blocks and transmitting those data blocks to legacy station 201-i. Legacy host computer 202-i is also capable of receiving data blocks from legacy station 201-i and of processing and using the data contained within those data blocks. Legacy host computer 202-i can be, for example, a desktop or a laptop computer that uses network 200 to communicate with other hosts and devices. It will be clear to those skilled in the art how to make and use legacy host computer 202-i.

Enhanced station 203-j (or, concisely, "station" 203-j), for j=1 through N, comprises the radios that enable host computer 204j to communicate via communications medium 205 by using one or more of shared-communications channels 206-1 through 206-P at a time. Station 203-j is capable of receiving data blocks from host computer 204-j and transmitting over communications medium 205 data frames comprising the data received from host computer 204-j. Station 203-j is also capable of receiving data frames from shared communications channel 205 and sending to host computer 204-j data blocks comprising data from the data frames. It will be clear to those skilled in the art, after reading this specification, how to make and use station 203-j. The salient details for station 203-j are described below and with respect to FIG. 3.

Host computer 204-j is capable of generating data blocks and transmitting those data blocks to station 203-j. Host computer 204-j is also capable of receiving data blocks from station 203-j and of processing and using the data contained within those data blocks. Host computer 204-j can be, for example, a desktop or a laptop computer that uses network 200 to communicate with other hosts and devices. It will be clear to those skilled in the art how to make and use host computer 204-j.

In some embodiments, station 203j, wherein j is equal to a value between 1 and N, inclusive, is an access point as is known in the art. Station 203j, when functioning as an access point, enables other stations 203-1 through 203-N within network 200 to communicate with devices in other communications networks. Furthermore, stations 203-1 through 203-N communicate with each other through the access point, because the access point can be used to coordinate communications on network 200.

Communications medium 205 comprises one or more shared-communications channels 206-k, for k=1 through P. Shared-communications channel 206-k exists in a variety of forms. For example, each shared-communications channel 206-k can correspond to a given block of frequency spectrum out of multiple blocks, contiguous or otherwise. It will be clear to those skilled in the art how to allocate one or more shared-communications channels 206-k, for k=1 through P.

Figure 3:
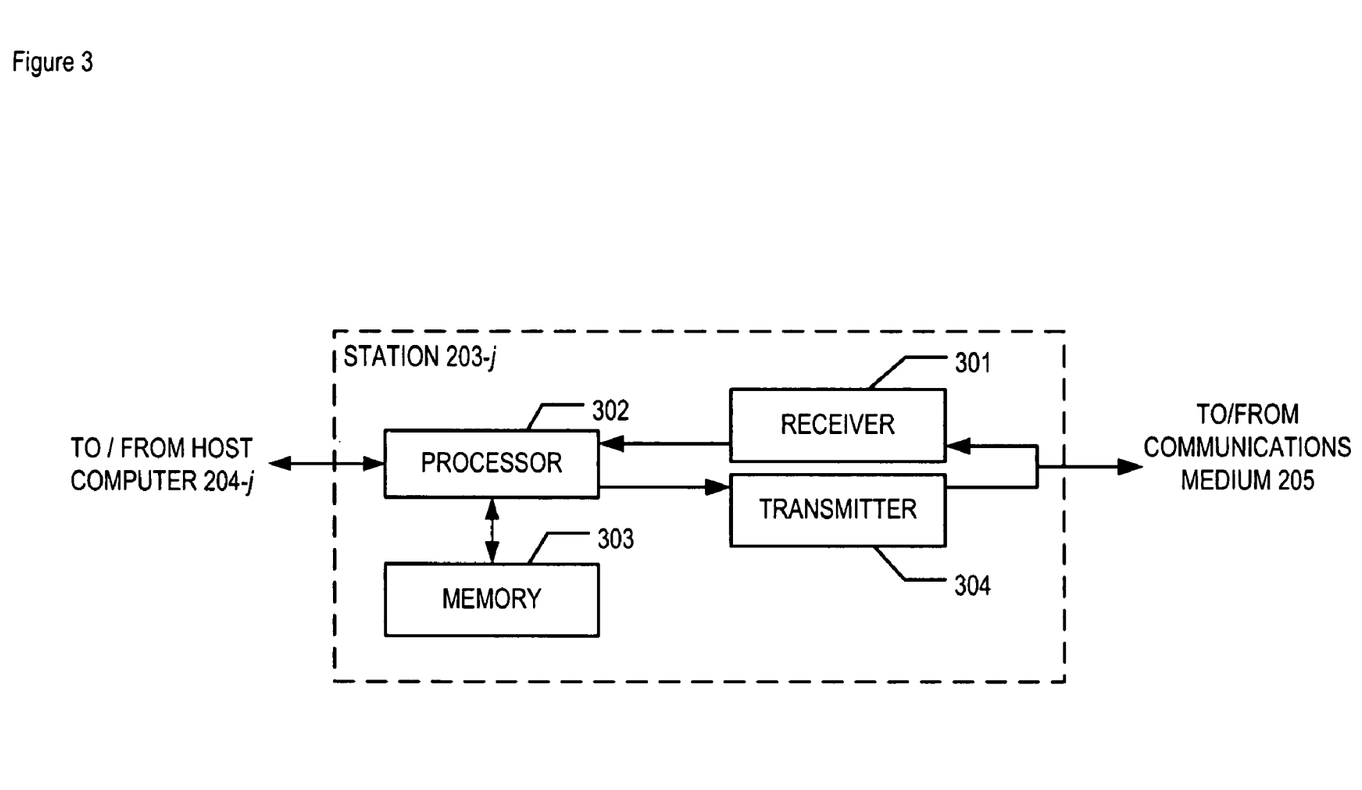
FIG. 3 depicts a block diagram of the salient components of station 203-j in accordance with the illustrative embodiment of the present invention.

FIG. 3 depicts a block diagram of the salient components of station 203-j in accordance with the illustrative embodiment of the present invention. Station 203-j comprises receiver 301-j, processor 302-j, memory 303-j, and transmitter 304-j, interconnected as shown.

Receiver 301-j is a circuit that is capable of receiving frames from one or more of shared-communications channels 206-1 through 206-P, in well-known fashion, and of forwarding them to processor 302-j. It will be clear to those skilled in the art how to make and use receiver 301-j.

Processor 302-j is a general-purpose processor that is capable of performing the tasks described below and with respect to FIGS. 4 through 7. It will be clear to those skilled in the art, after reading this specification, how to make and use processor 302-$j$.

Memory 303-$j$ is capable of storing programs and data used by processor 302-$j$. It will be clear to those skilled in the art how to make and use memory 303-$j$.

Transmitter 304-$j$ is a circuit that is capable of receiving frames from processor 302-$j$, in well-known fashion, and of transmitting them on one or more of shared-communications channels 206-1 through 206-P. It will be clear to those skilled in the art how to make and use transmitter 304-$j$.

Figure 4:
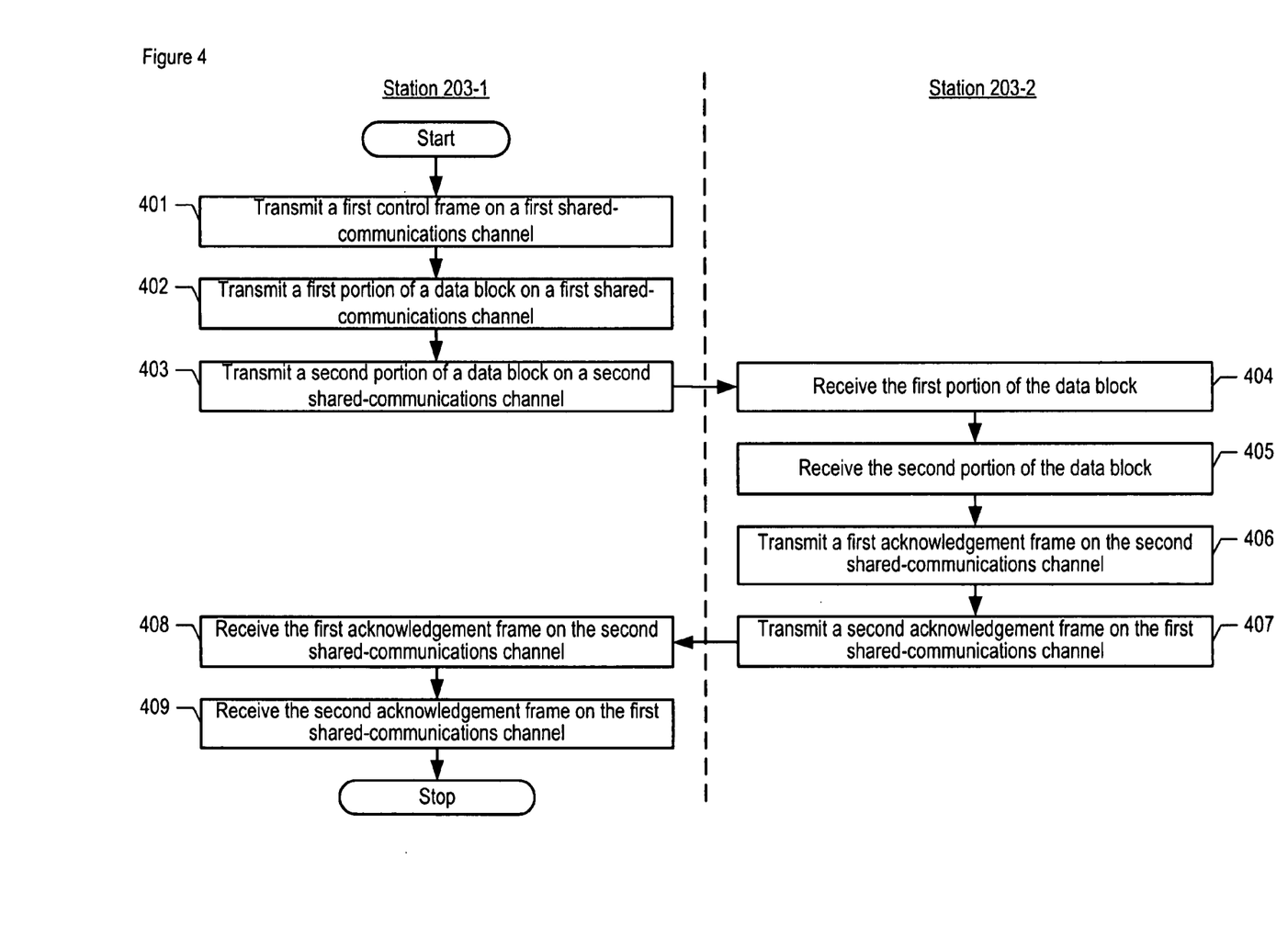
FIG. 4 depicts a flowchart of the salient tasks performed in accordance with the first illustrative embodiment of the present invention.

FIG. 4 depicts a flowchart in accordance with the first illustrative embodiment of the present invention. In the example depicted, station 203-1 exchanges frames with station 203-2. It will be clear to those skilled in the art, after reading this specification, how to make and use stations that exchange frames in the manner depicted.

For pedagogical purposes, two shared-communications channels are used throughout the examples in this specification. It will be clear, however, to those skilled in the art, after reading this specification, how to apply the illustrative embodiment of the present invention to two or more shared-communications channels.

At task 401, in some embodiments, station 203-1 transmits a first control frame on shared-communications channel 206-1 in well-known fashion. In some embodiments, the first control frame is a request_to_send frame or a clear_to_send frame, as is known in the art. It will be clear to those skilled in the art how to make and use a control frame.

Station 203-1, in some embodiments, also transmits a second control frame on shared-communications channel 206-2. In some embodiments, the second control frame is a request_to_send frame or a clear_to_send frame, as is known in the art.

Station 203-1, in some embodiments, transmits the first and second control frame at substantially the same time. Transmitting the first and second control frame at substantially the same time and with the duration fields set to an effective value has the effect of protecting a pending data block transmission that utilizes both shared-communications channel 206-1 and 206-2. It will be clear to those skilled in the art how to set the duration field to a value that is effective in covering the time interval of a subsequent data transmission. In this specification, control frames transmitted in this fashion are referred to as providing "stacked protection."

At task 402, station 203-1 transmits to station 203-2 a first portion of a data block on shared-communications channel 206-1, in well-known fashion.

At task 403, station 203-1 transmits to station 203-2 a second portion of the data block on shared-communications channel 206-2, in well-known fashion. In some embodiments, the first portion corresponds to the part of a multi-channel-modulated signal that utilizes shared-communications channel 206-1, while the second portion corresponds to the part of the same multi-channel-modulated signal that utilizes shared-communications channel 206-2. Stated differently, the first portion and the second portion constitute the same modulated signal. In other embodiments, the first portion corresponds to a first collection of bits constituting a data block, while the second portion corresponds to a second collection of bits constituting the same data block. It will be clear to those skilled in the art how to allot portions of a data block across multiple shared-communications channels in other ways.

Station 203-1, in some embodiments, transmits the first portion and the second portion of the data block at substantially the same time.

At task 404, station 203-2 receives the first portion of the data block.

At task 405, station 203-2 receives the second portion of the data block.

At task 406, station 203-2 transmits to station 203-1 a first acknowledgment frame on shared-communications channel 206-2. The first acknowledgment frame comprises an indication of having received (i) the first portion of the data block, (ii) the second portion of the data block, or (iii) both. In other embodiments, the first acknowledgment frame comprises an indication of having received either (i) all of the transmitted portions of the data block or (ii) not all of the transmitted portions of the data block. It will be clear to those skilled in the art how to provide the indication in the first acknowledgment frame.

At task 407, station 203-2 transmits to station 203-1 a second acknowledgment frame on shared-communications channel 206-1. The second acknowledgment frame comprises an indication of having received (i) the first portion of the data block, (ii) the second portion of the data block, or (iii) both. It will be clear to those skilled in the art how to provide the indication in the second acknowledgment frame.

Station 203-2, in some embodiments, transmits the first acknowledgment frame and second acknowledgment frame at substantially the same time.

At task 408, station 203-1 receives the first acknowledgment frame.

At task 409, station 203-1 receives the second acknowledgment frame.

In some embodiments, station 203-1 transmits an additional portion of the data block after receiving one or both of the first and second acknowledgment frames. Station 203-1, in some embodiments, transmits the additional portion of the data block on one shared-communications channel 206-$k$ (e.g., shared-communications channel 206-1, etc.). In other embodiments, station 203-1 transmits the additional portion of the data block on more than one shared-communications channel 206-$k$.

Figure 5:
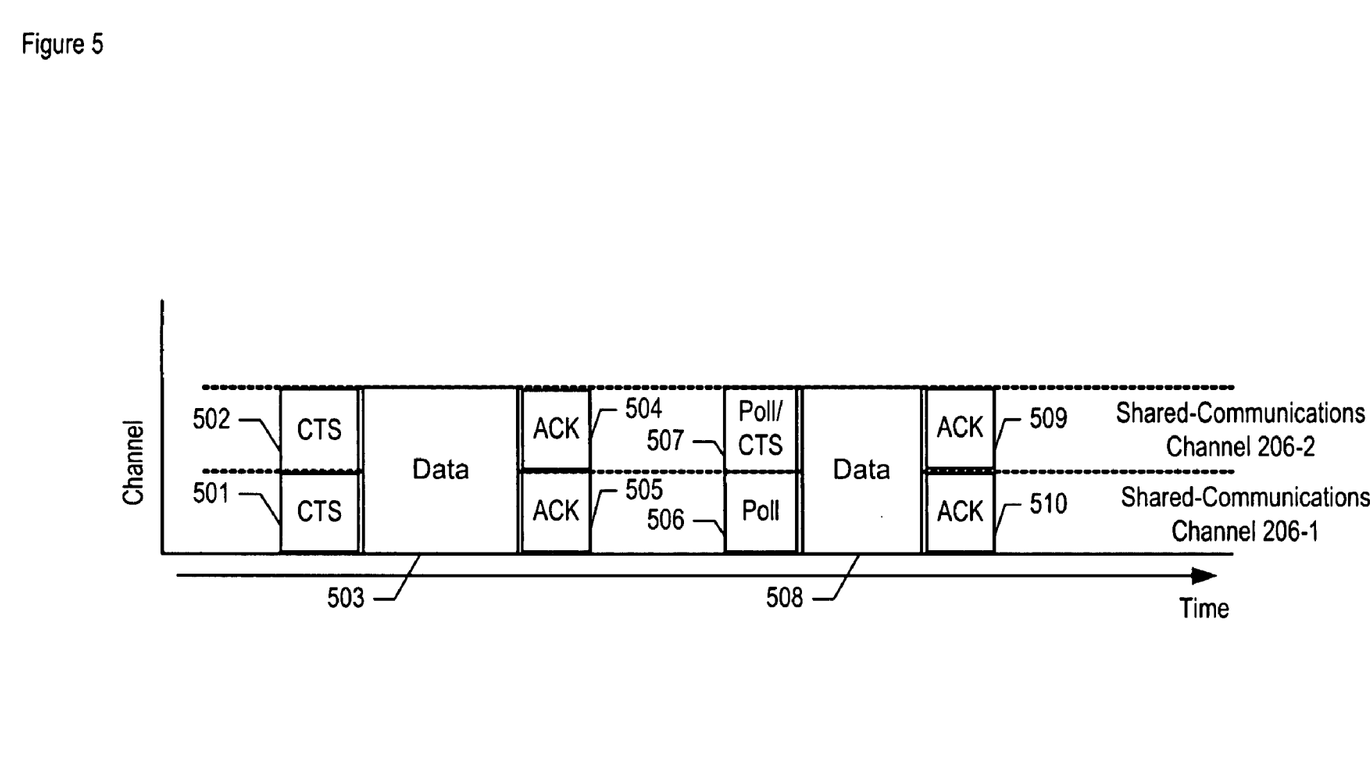
FIG. 5 depicts a message flow diagram in accordance with the first illustrative embodiment of the present invention.

FIG. 5 depicts a message flow diagram in accordance with the first illustrative embodiment of the present invention. In the two examples depicted, station 203-1 exchanges frames with station 203-2. It will be clear to those skilled in the art, after reading this specification, how to make and use stations that exchange frames in the manner depicted.

In the first example, station 203-1 transmits clear_to_send control frames 501 and 502 in well-known fashion. Each of control frames 501 and 502 specify a duration value as is known in the art that protects the pending transmission of a data block on shared-communications channel 206-1 and concurrently on shared-communications channel 206-2.

Station 203-1 then transmits to station 203-2 data block 503 using both shared-communications channels 206-1 and 206-2.

Upon receiving data block 503, station 203-2 transmits to station 203-1 acknowledgment frames 504 and 505 in well-known fashion. Acknowledgment frames 504 and 505 each comprise an indication of the channel or channels on which data block 503 was received.

In the second example, station 203-1, an access point in this example, transmits poll frames 506 and 507 in well-known fashion. Each of poll frames 506 and 507 specify a duration value as is known in the art that protects the pending transmission of a data block on shared-communications channel 206-1 and concurrently on shared-communications channel 206-2.

Station 203-1 then transmits to station 203-2 data block 508 using both shared-communications channels 206-1 and 206-2.

Upon receiving data block 508, station 203-2 transmits to station 203-1 acknowledgment frames 509 and 510 in well-known fashion. Acknowledgment frames 509 and 510 each comprise an indication of the channel or channels on which data block 508 was received.

Figure 6:
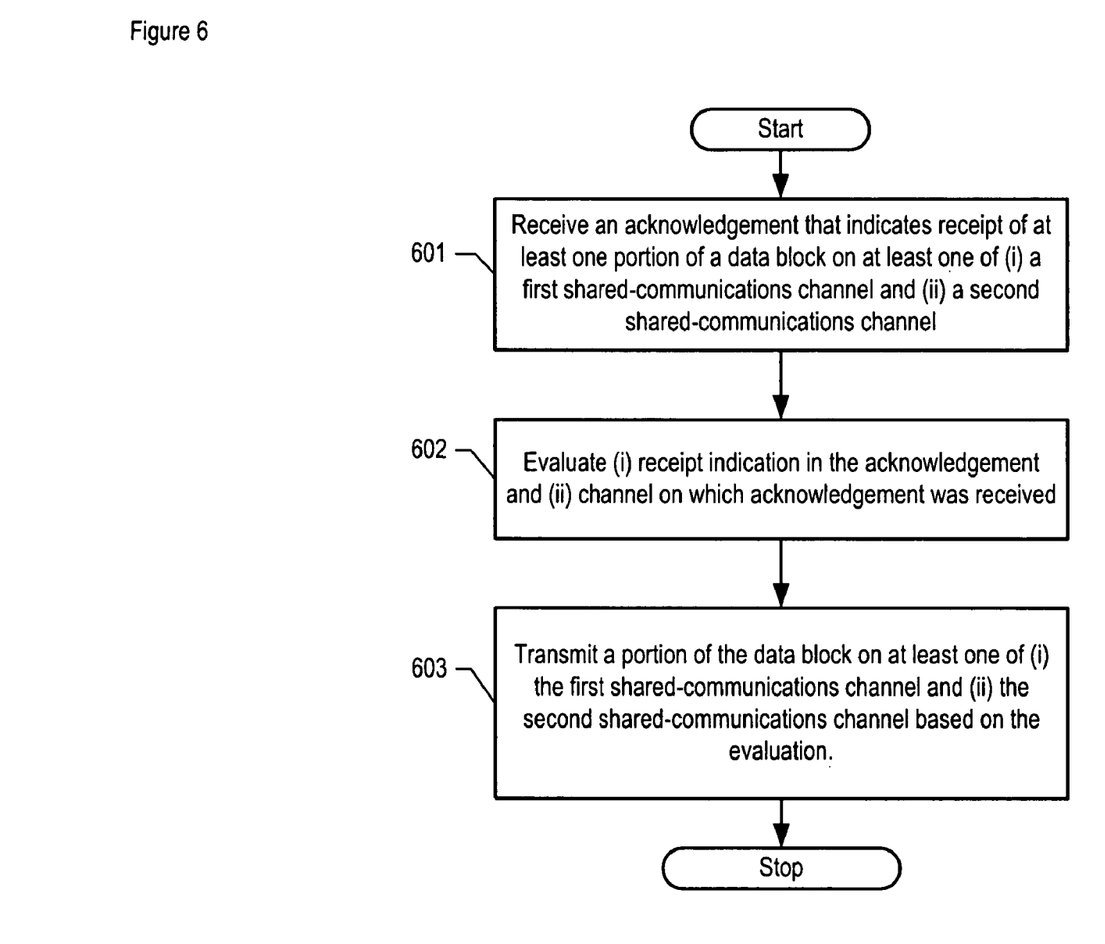
FIG. 6 depicts a flowchart of the salient tasks performed in accordance with the second illustrative embodiment of the present invention.

FIG. 6 depicts a flowchart in accordance with the second illustrative embodiment of the present invention. In the example depicted, station 203-3 processes frames in accordance with the illustrative embodiment.

At task 601, station 203-3 receives an acknowledgment after having transmitted a data block via both shared-communications channels 206-1 and 206-2. The acknowledgment indicates receipt of at least one portion of the data block on (i) shared-communications channel 206-1, (ii) shared-communications channel 206-2, or (iii) both.

At task 602, station 203-3 evaluates the received acknowledgment. Station 203-3 checks if the acknowledgment was received on both channels or one channel. Station 203-3 checks each acknowledgment frame received for an indication of the channel or channels over which the data block was successfully received.

At task 603, station 203-3 re-transmits a portion of the data block. Station 203-3 re-transmits on one of or both shared-communications channels 206-1 and 206-2. In accordance with the illustrative embodiment of the present invention, station 203-3 chooses the channel or channels over which to re-transmit based on the evaluation performed at task 602.

Figure 7:
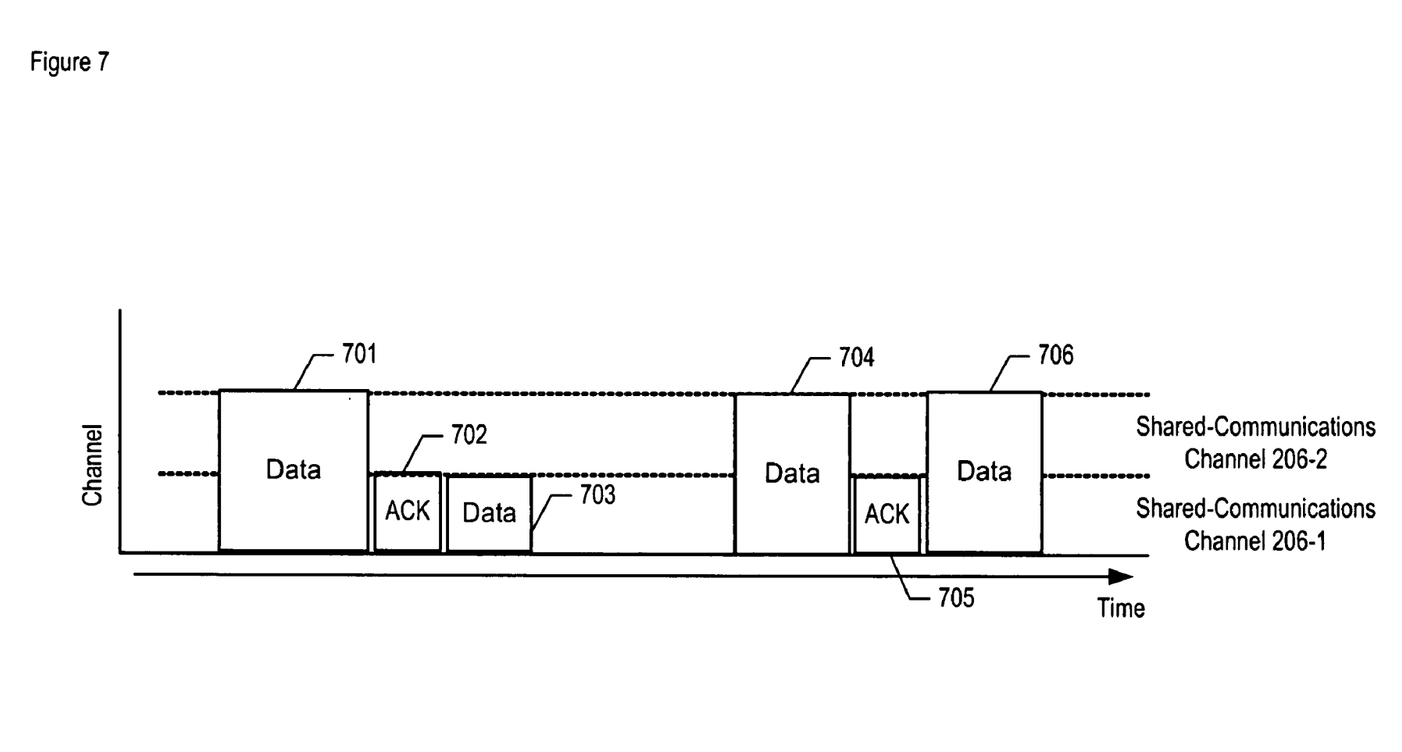
FIG. 7 depicts a message flow diagram in accordance with the second illustrative embodiment of the present invention.

FIG. 7 depicts a message flow diagram in accordance with the second illustrative embodiment of the present invention. In the two examples depicted, station 203-3 exchanges frames with station 203-4 in accordance with the illustrative embodiment.

In the first example depicted, station 203-3 transmits data block 701 to station 203-4 in well-known fashion. Data block 701 comprises a first portion that is transmitted on shared-communications channel 206-1 and a second portion that is transmitted on shared-communications channel 206-2.

Station 203-4 receives the first portion of data block 701 on shared-communications channel 206-1. As part of the example, station 203-4 does not receive the second portion of data block 701. Station 203-4 transmits to station 203-3 first acknowledgment frame 702 indicating that has received the first portion of data block 701.

Acknowledgment frame 702 comprises fields that are used to indicate receipt of the corresponding portions of data. For instance, the fields can indicate the particular portion of data received, the shared-communications channel over which the portion was received, etc.

Station 203-3 then receives first acknowledgment frame 702 on shared-communications channel 206-1 from station 203-4. Station 203-3 determines that it only received an acknowledgment frame (i.e., acknowledgment frame 702) on shared-communications channel 206-1 and that received acknowledgment frame 702 indicated that only the first portion of data block 701 was received by station 203-4 and on shared-communications channel 206-1.

Consequently, station 203-3 re-transmits the second portion of data block 701, in the form of data block 703, on shared-communications channel 206-1. Station 203-3 bases this decision on the contents of received acknowledgment 702 and on the shared-communications channel on which acknowledgment 702 was received (i.e., shared-communications channel 206-1).

In the second example depicted, station 203-3 transmits data block 704 to station 203-4 in well-known fashion. Data block 704 comprises a first portion that is transmitted on shared-communications channel 206-1 and a second portion that is transmitted on shared-communications channel 206-2.

The difference of the second example from the first example is that station 203-4 receives the second portion of data block 704 on shared-communications channel 206-2. Also, station 203-4 does not receive the first portion of data block 704. Station 203-4 transmits to station 203-3 first acknowledgment frame 705 indicating that it has received the second portion of data block 704.

Station 203-3 then receives first acknowledgment frame 705 on shared-communications channel 206-1 from station 203-4. Station 203-3 determines that it only received an acknowledgment frame (i.e., acknowledgment frame 705) on shared-communications channel 206-1 and that received acknowledgment frame 705 indicated that only the second portion of data block 704 was received by station 203-4 and on shared-communications channel 206-2.

Consequently, station 203-3 re-transmits the first portion of data block 704, in the form of data block 706, using both shared-communications channels 206-1 and 206-2. Station 203-3 bases this decision on the contents of received acknowledgment 705 and on the shared-communications channel on which the acknowledgment was received (i.e., shared-communications channel 206-1).

It will be clear to those skilled in the art that other outcomes are possible, with respect to re-transmitting portions of data blocks based on the contents of an acknowledgment, the shared-communications channel on which the acknowledgment was received, and other conditions.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments.

It is therefore intended that such variations be included within the scope of the following claims and their equivalents.

What is claimed is:

1. A multiple channel modulation method in a wireless local area network, the method comprising:
   receiving a first portion of a data block on a first shared-communications channel;
   receiving a second portion of said data block on a second shared-communications channel;
   transmitting a first acknowledgment frame into said second shared-communications channel, wherein said first acknowledgment frame indicates receipt of said first portion and said second portion of said data block; and
   transmitting a duplicate first acknowledgment frame into said first shared-communications channel, wherein said duplicate first acknowledgment frame indicates receipt of said first portion and said second portion of said data block,
   wherein a first station transmits using said first shared-communications channel and said second shared-communications channel simultaneously and wherein a second station transmits using said first shared-communications channel only.

2. The method of claim 1 wherein said first acknowledgment frame and said duplicate first acknowledgment frame are transmitted at substantially the same time.

3. A multiple channel modulation method in a wireless local area network, the method comprising:
   transmitting a first portion of a data block into a first shared-communications channel;
   transmitting a second portion of said data block into a second shared-communications channel;
   receiving a first acknowledgment frame on said second shared-communications channel, wherein said first acknowledgment frame indicates receipt of said first portion and said second portion of said data block; and
   receiving a second acknowledgment frame duplicative of the first acknowledgement frame on said first shared-communications channel, wherein said second acknowledgment frame indicates receipt of said first portion and said second portion of said data block,
   wherein a first station transmits using said first shared-communications channel and said second shared-communications channel simultaneously and wherein a second station transmits using said first shared-communications channel only.

4. The method of claim 3 wherein transmitting said first portion of said data block and transmitting said second portion of said data block occur (i) at substantially the same time and (ii) with the same modulation.

5. The method of claim 3 further comprising:
   transmitting a first control frame into said first shared-communications channel before transmitting said first portion of said data block; and
   transmitting a second control frame into said second shared-communications channel before transmitting said second portion of said data block.

6. The method of claim 5 wherein said first control frame is one of a Request_to_Send frame and a Clear_to_Send frame.

7. A multiple channel modulation method in a wireless local area network, the method comprising:
   receiving first and second duplicative acknowledgements that indicate receipt of a first and second portion of a data block on a first shared-communications channel and a second shared-communications channel; and
   transmitting a portion of said data block into at least one of (i) said first shared-communications channel and (ii) said second shared-communications channel, wherein the choice of shared-communications channel used for transmitting said portion is based on (a) the contents of said acknowledgments and (b) the shared-communications channel over which said acknowledgements were received,
   wherein said first acknowledgment frame also indicates receipt of said second portion of said data block, and wherein said second acknowledgment frame also indicates receipt of said first portion of said data block; and
   wherein a first station transmits using said first shared-communications channel and said second shared-communications channel simultaneously and wherein a second station transmits using said first shared-communications channel only.

8. The method of claim 7 wherein said acknowledgments comprise at least one of (i) a first acknowledgment frame received on said second shared-communications channel and (ii) a second acknowledgment frame received on said first shared-communications channel.

9. The method of claim 8 wherein said first acknowledgment frame indicates receipt of at least one of (i) a first portion of said data block sent on said first shared-communications channel and (i) a second portion of said data block sent on said second shared-communications channel.

10. The method of claim 7 wherein transmitting said portion of said data block occurs over the combination of said first shared-communications channel and said second shared-communications channel.

11. An apparatus in a multiple channel modulation system in a wireless local area network, the apparatus comprising:
   a receiver for:
      (i) receiving a first portion of a data block on a first shared-communications channel; and
      (ii) receiving a second portion of said data block on a second shared-communications channel; and
   a transmitter for:
      (i) transmitting a first acknowledgment frame into said second shared-communications channel, wherein said first acknowledgment frame indicates receipt of said first portion and said second portion of said data block; and
      (ii) transmitting a duplicative second acknowledgment frame into said first shared-communications channel, wherein said second acknowledgment frame indicates receipt of said first portion and said second portion of said data block,
   wherein said receiver and said transmitter constitute a first station, which transmits using said first shared-communications channel and said second shared-communications channel simultaneously and wherein a second station transmits using said first shared-communications channel only.

12. The apparatus of claim 11 wherein said transmitter transmits said first acknowledgment frame and said duplicative second acknowledgment frame at substantially the same time.

13. An apparatus in a multiple channel modulation system in a wireless local area network, the apparatus comprising:
   a transmitter for:
      (i) transmitting a first portion of a data block into a first shared-communications channel; and
      (ii) transmitting a second portion of said data block into a second shared-communications channel; and a receiver for receiving a first acknowledgment frame on said second shared-communications channel, wherein said first acknowledgment frame indicates receipt of said first portion and said second portion of said data block; and receiving a duplicative second acknowledgment frame on said first shared-communications channel, wherein said duplicative second acknowledgment frame indicates receipt of said first portion and said second portion of said data block, wherein said receiver and said transmitter constitute a first station, which transmits using said first shared-communications channel and said second shared-communications channel simultaneously and wherein a second station transmits using said first shared-communications channel only.

14. The apparatus of claim 13 wherein said transmitter transmits said first portion of said data block and said second portion of said data block (i) at substantially the same time and (ii) with the same modulation.

15. The apparatus of claim 13 wherein said transmitter is also for (i) transmitting a first control frame into said first shared-communications channel before transmitting said first portion of said data block and (ii) transmitting a second control frame into said second shared-communications channel before transmitting said second portion of said data block.

16. The apparatus of claim 15 wherein said first control frame is one of a Request_to_Send frame and a Clear_to_Send frame.

17. An apparatus in a multiple channel modulation system in a wireless local area network, the apparatus comprising:

a receiver for receiving duplicative acknowledgments that indicates receipt of a first portion and a second portion of a data block on a first shared-communications channel and a second shared-communications channel; and a transmitter for transmitting a portion of said data block into at least one of (i) said first shared-communications channel and (ii) said second shared-communications channel, wherein the choice of shared-communications channel used for transmitting said portion is based on (a) the contents of said acknowledgments and (b) the shared-communications channel over which said acknowledgements were received, wherein said acknowledgments comprise a first acknowledgment frame received on said second shared-communications channel and a duplicative second acknowledgment frame received on said first shared-communications channel, said first acknowledgment frame indicates receipt of a first portion of said data block sent on said first shared-communications channel and a second portion of said data block sent on said second shared-communications channel; and transmitting said portion of said data block occurs over the combination of said first shared-communications channel and said second shared-communications channel simultaneously.

* * * * *